United States Patent
Inada et al.

(10) Patent No.: US 7,301,441 B2
(45) Date of Patent: Nov. 27, 2007

(54) BOARDING ENVIRONMENT CONTROLLING SYSTEM, BOARDING ENVIRONMENT CONTROLLING APPARATUS, AND BOARDING ENVIRONMENT CONTROLLING METHOD

(75) Inventors: Shinsaku Inada, Tokyo (JP); Akira Sakamoto, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/696,024

(22) Filed: Oct. 29, 2003

(65) Prior Publication Data

US 2004/0124968 A1 Jul. 1, 2004

(30) Foreign Application Priority Data

Dec. 19, 2002 (JP) ............................. P2002-368103

(51) Int. Cl.
 *B60R 25/00* (2006.01)

(52) U.S. Cl. ............................. 340/426.13; 340/426.36; 340/5.65; 340/5.8; 307/9.1; 307/10.1; 701/2; 701/36; 701/49

(58) Field of Classification Search ........... 340/426.13, 340/426.36, 5.65, 5.8; 307/9.1, 10.1; 701/2, 701/36, 49

See application file for complete search history.

(56) References Cited

U.S. PATENT DOCUMENTS

| | | | | |
|---|---|---|---|---|
| 5,808,374 A | * | 9/1998 | Miller et al. ................. | 307/10.1 |
| 6,100,811 A | * | 8/2000 | Hsu et al. .................... | 340/5.83 |
| 6,140,939 A | * | 10/2000 | Flick ........................ | 340/825.69 |
| 6,144,114 A | * | 11/2000 | Chutorash ................... | 307/10.5 |
| 6,282,475 B1 | * | 8/2001 | Washington .................. | 701/49 |
| 6,710,700 B1 | * | 3/2004 | Tatsukawa et al. .......... | 340/5.53 |
| 6,718,240 B1 | * | 4/2004 | Suda et al. .................... | 701/36 |
| 6,785,595 B2 | * | 8/2004 | Kominami et al. ............ | 701/36 |
| 2002/0197976 A1 | * | 12/2002 | Liu et al. ..................... | 455/352 |
| 2003/0078709 A1 | * | 4/2003 | Yester et al. .................. | 701/36 |
| 2003/0157920 A1 | * | 8/2003 | Liu et al. ..................... | 455/352 |
| 2004/0019591 A1 | * | 1/2004 | Gardner ........................ | 707/3 |

FOREIGN PATENT DOCUMENTS

| | | |
|---|---|---|
| DE | 19801119 C1 | 9/1999 |
| DE | 10048394 A1 | 10/2001 |
| DE | 10042055 A1 | 3/2002 |
| DE | 10103044 A1 | 7/2002 |

(Continued)

OTHER PUBLICATIONS

Office Action dated Oct. 3, 2006 from corresponding Japanese Application citing above listed references.

*Primary Examiner*—Jeffery Hofsass
*Assistant Examiner*—Samuel J Walk
(74) *Attorney, Agent, or Firm*—Lerner, David, Littenberg, Krumholz & Mentlik, LLP

(57) ABSTRACT

A vehicle boarding environment controlling apparatus having a communicating element communicating with a communication device that detects a detection target object for personal authentication; a registration storing element for storing registration of setting status information denoting a predetermined boarding environment of a vehicle in association with each person to be authenticated; a door lock controlling element for unlocking doors of the vehicle when a person is authenticated; and a setting status controlling element which, if any person is authenticated, changes the boarding environment setting status of the vehicle in accordance with the setting status information associated with the authenticated person.

5 Claims, 12 Drawing Sheets

FOREIGN PATENT DOCUMENTS

| | | |
|---|---|---|
| EP | 1113405 A2 | 7/2001 |
| JP | 62-6048 | 1/1987 |
| JP | 01-095955 | 4/1989 |
| JP | 11-093478 | 4/1999 |
| JP | 11-245771 | 9/1999 |
| JP | 2000-016203 | 1/2000 |
| JP | 2001-152718 | 6/2001 |
| JP | 2001-262899 | 9/2001 |
| JP | 2002-197566 A | 7/2002 |
| JP | 2002-331885 | 11/2002 |

* cited by examiner

FIG. 6A

AUTHENTICATION TABLE

| USER ID | FINGERPRINT DATA | PASSWORD |
|---------|------------------|----------|
|         |                  |          |
|         |                  |          |
| ⋮       | ⋮                | ⋮        |

FIG. 6B

VEHICLE BODY-RELATED SETTING TABLE

| USER ID | EXTERIOR MIRROR POSITION INFORMATION | INTERIOR MIRROR POSITION INFORMATION | SEAT POSITION INFORMATION |
|---------|--------------------------------------|--------------------------------------|---------------------------|
|         |                                      |                                      |                           |
|         |                                      |                                      |                           |
| ⋮       | ⋮                                    | ⋮                                    | ⋮                         |

FIG. 8A

CONTENT LIST

| No. | CONTENT ID |
|---|---|
| 1 | xxxxxh |
| 2 | xxxxxh |
| ⋮ | ⋮ |
| n−1 | xxxxxh |
| n | xxxxxh |

FIG. 8B

FREQUENCY LIST

| RANK | CONTENT ID | REPRODUCTION COUNT |
|---|---|---|
| 1 | xxxxxh | 24 |
| 2 | xxxxxh | 21 |
| ⋮ | ⋮ | ⋮ |
| n−1 | xxxxxh | 2 |
| n | xxxxxh | 1 |

FIG. 9

AV SETTING TABLE

| USER ID | L/R BALANCE | F/R BALANCE | VOLUME | TUNER PRESET | PICTURE QUALITY SETTING INFORMATION |
|---------|-------------|-------------|--------|--------------|-------------------------------------|
| ...... | ...... | ...... | ...... | ...... | ...... |

BOARDING ENVIRONMENT CONTROLLING SYSTEM, BOARDING ENVIRONMENT CONTROLLING APPARATUS, AND BOARDING ENVIRONMENT CONTROLLING METHOD

BACKGROUND OF THE INVENTION

The present invention relates to a boarding environment controlling system, a boarding environment controlling apparatus, and a boarding environment controlling method for controlling the boarding environment of a vehicle.

The practice of installing so-called keyless entry systems into vehicles has become widespread in recent years. The keyless entry system is typically made up of a remote controller carried by the user, and keyless entry equipment installed on board the vehicle. When getting off and leaving the vehicle, the user illustratively operates the remote controller to lock the doors of the vehicle. In response to the user's operation, the remote controller transmits a door locking command wirelessly (e.g., by radio waves) to the vehicle. The command, when received by the vehicle, causes its doors to be locked automatically.

Before getting into the vehicle, the user operates the remote controller to unlock the doors. In response to the user's operation, the remote controller transmits an unlock command to the vehicle. When received by the vehicle, the command causes its doors to be unlocked automatically.

The keyless entry system, when mounted on board the vehicle, eliminates the need for the user physically to insert the key into the keyhole to lock or unlock the doors. This provides extra convenience to the user.

Most of conventional keyless entry systems are designed to lock and unlock the vehicle doors simply in response to lock and unlock commands sent from the user's remote controller. In other words, anyone in possession of a remote controller can unlock the doors of the corresponding vehicle. This could pose a security breach letting criminals break into a car for theft or commit an outright car theft.

Some measures have been proposed to reinforce security, involving the combination of conventional keyless entry systems with what is known as a personal authentication system such as a fingerprint matching system. One such combination system is disclosed illustratively in Japanese Patent Laid-Open No. Hei 5-81412.

The personal authentication system typically matches the fingerprint of the person in possession of the remote controller against previously recorded fingerprints for personal authentication. If a matched fingerprint record provides authentication of the remote controller's owner, that person may operate the remote controller to lock or unlock the vehicle doors. In case of a mismatch, operating the remote controller fails to lock or unlock the doors.

The personal authentication system thus allows only the user whose has his or her fingerprint registered beforehand to lock or unlock the vehicle doors using the remote controller. Anyone with his or her fingerprint yet to be registered is unable to lock or unlock the doors. This is an appreciable improvement in security brought about by the keyless entry system.

At present, however, the above-described keyless entry system combined with the personal authentication system appears only to reinforce security. The combination will add more value to the vehicle equipped with the keyless entry system if the vehicle user is offered more convenient features thereby.

SUMMARY OF THE INVENTION

In solving the foregoing and other problems of the related art and according to one aspect of the invention, there is provided a boarding environment controlling system constituted by a communication device and by a boarding environment controlling apparatus which is mounted on a vehicle and which communicates with the communication device. The boarding environment controlling system includes: a detecting element which is included in the communication device and which detects a detection target object for personal authentication; a personal authentication processing element for performing a personal authentication process based on the detection target object detected by the detecting element; a registration storing element which, in association with each of persons to be authenticated in the personal authenticating process, stores registration of setting status information denoting a predetermined boarding environment of the vehicle; a door lock controlling element which is included in the boarding environment controlling apparatus and which unlocks doors of the vehicle when any one of the persons is authenticated in the personal authentication process; and a setting status controlling element which is included in the boarding environment controlling apparatus and which, if any one of the persons is authenticated in the personal authentication process, changes the boarding environment setting status of the vehicle in accordance with the setting status information associated with the authenticated person from among the setting status information stored in the registration storing element.

According to another aspect of the invention, there is provided a boarding environment controlling apparatus includes: a communicating element for communicating with a communication device which detects a detection target object for personal authentication; a registration storing element for storing registration of setting status information denoting a predetermined boarding environment of a vehicle in association with each of persons to be authenticated in a personal authentication process performed in accordance with the detection target object detected by the communication device; a door lock controlling element for unlocking doors of the vehicle when any one of the persons is authenticated in the personal authentication process; and a setting status controlling element which, if any one of the persons is authenticated in the personal authentication process, changes the boarding environment setting status of the vehicle in accordance with the setting status information associated with the authenticated person from among the setting status information stored in the registration storing element.

According to a further aspect of the invention, there is provided a boarding environment controlling method for use with a boarding environment controlling system constituted by a communication device and by a boarding environment controlling apparatus which is mounted on a vehicle and which communicates with the communication device. The boarding environment controlling method includes the steps of: detecting a detection target object for personal authentication through the communication device; performing a personal authentication process based on the detection target object detected in the detecting step; storing, into a predetermined storage area, registration of setting status information denoting a predetermined boarding environment of the vehicle in association with each of persons to be authenticated in the personal authenticating process; unlocking doors of the vehicle through the boarding environment controlling apparatus when any one of the persons is authenticated in the personal authentication process; and if any one of the persons is authenticated in the personal authentication process, then changing, through the boarding environment controlling apparatus, the boarding environment setting status of the vehicle in accordance with the setting status information associated with the authenticated person from among the setting status information stored in the storage areas.

Where the inventive system, apparatus, and method are in use, the personal authentication process is performed on the basis of the detection target object detected by the communication device. When a person is authenticated in the personal authentication process, the vehicle doors are first locked or unlocked for the authenticated person. That is, the basic scheme of the invention involves combining a personal authentication system with a keyless entry system on board the vehicle.

Personal authentication is carried out based on user-specific physical features such as fingerprint or voiceprint. In other words, where a plurality of users have been registered as objects of personal authentication with the personal authentication system combined with the keyless entry system as outlined above, each of the registered persons can be authenticated for authorized use of the vehicle.

A particular feature of the invention is that when a person is authenticated in the personal authentication process, boarding environment settings are changed for the sake of the authenticated person in accordance with the boarding environment setting information registered beforehand in association with each of the registered persons. That is, according to the invention, the personal authentication system combined with the keyless entry system is supplemented with the function of automatically setting up a boarding environment optimally fit for each user of the vehicle.

BRIEF DESCRIPTION OF THE DRAWINGS

Further objects and advantages of this invention will become apparent upon a reading of the following description and appended drawings in which:

FIGS. 6A and 6B are tabular views presenting typical structures of an authentication table and a vehicle body-related setting table;

FIGS. 8A and 8B are tabular views representing typical structures of a content list and a frequency list as part of the user content list table;

FIG. 9 is a tabular view showing a typical structure of an AV setting table;

DETAILED DESCRIPTION OF THE PREFERRED EMBODIMENTS

Figure 1:
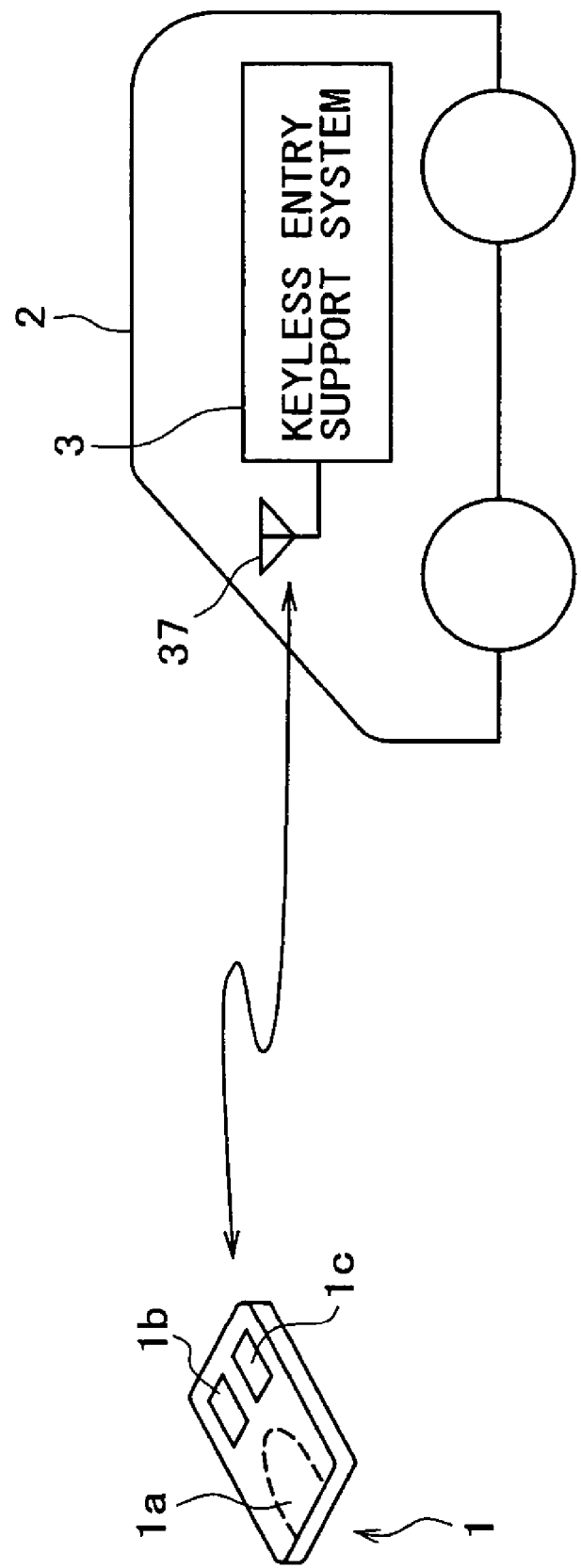
FIG. 1 is a schematic view showing an overall configuration of a keyless entry system embodying this invention.

Preferred embodiments of this invention will now be described under the following headings:
1. System configuration
　1.1 Overall configuration
　1.2 Remote controller
　1.3 Keyless entry support system
　1.4 Onboard equipment
2. Outline of system operations
3. Data structures
4. Processing operations
1. System Configuration 1.1 Overall Configuration FIG. 1 shows an overall configuration of a keyless entry system embodying this invention.

As illustrated, the inventive keyless entry system includes a remote controller 1 and a keyless entry system 3 mounted on board a vehicle 2.

The remote controller 1, carried by a user (i.e., vehicle's driver), has a size small enough to be held by one hand. The keyless entry system of this embodiment is combined with a personal authentication system. As is well known, personal authentication involves detecting individually unique physical features such as voiceprint or fingerprint and checking what is detected against previously registered records for a match. This is a technique that ensures a considerably high degree of security. The inventive personal authentication system adopts, not exclusively but merely illustratively, a fingerprint matching scheme.

Because the personal authentication system of the invention operates on the fingerprint matching principle, the enclosure of the remote controller 1 has a fingertip pressing block 1a. When a user presses his or her fingertip onto the fingertip pressing block 1a, a predetermined detection method is activated to detect fingerprints from the pressed fingertip.

The fingerprint detection process need not be executed exclusively by any specific method. Any known or yet-to-be-developed detection methods may be adopted when deemed appropriate. One such method may be an imaging method whereby fingerprints are imaged by imaging means such as a CCD camera. Another method may be a microswitch-based scheme involving a group of microswitches being individually activated or left inactive to detect a fingerprint pattern.

The remote controller 1 has illustratively a locking button 1b and an unlocking button 1c as operating elements to be manipulated by the user. The locking button 1b and unlocking button 1c are used to lock and unlock the doors of the vehicle 2, respectively. These buttons become operable only after the user has been authenticated by fingerprint matching as mentioned. The personal authentication process involved will be discussed later.

The user, when authenticated, may push the locking button 1b causing the remote controller 1 to transmit a door locking command. In that case, the command is received by an antenna 37 of the vehicle 2 and acquired by the keyless entry support system 3. With the door locking command thus received and acquired, the keyless entry support system 3 locks the doors of the vehicle 2.

The user, when authenticated, may push the unlocking button 1c causing the remote controller 1 to transmit a door unlocking command. In this case, the keyless entry support system 3 having received and acquired the command unlocks the doors of the vehicle 2 accordingly.

Where this embodiment is in use, a plurality of users may have their fingerprints registered with the keyless entry system. Each of these registered users may be authenticated in the personal authentication process.

As will be discussed later in more detail, unlocking the vehicle doors by operation of the unlocking button 1c on the remote controller 1 automatically changes various settings such as those of the mirror positions, driver seat positions, and AV equipment (onboard equipment) presets. These settings are changed upon unlocking of the doors so as to establish an optimum boarding environment for the user currently authenticated in the personal authentication process.

The keyless entry support system 3 on board the vehicle 2 is capable of executing the personal authentication process based on fingerprint matching. In operation, the remote controller 1 transmits information about the detected fingerprint. Upon receiving the transmitted information, the system 3 checks the detected fingerprint against previously registered fingerprints for a match.

Following successful personal authentication in the personal authentication process, the user operates the remote controller 1 to transmit a door locking or unlocking command. Given the command, the system 3 locks or unlocks the vehicle doors accordingly.

The two functions above, i.e., one for executing the personal authentication process based on fingerprint matching, the other for locking or unlocking the vehicle doors based on the transmitted command, work together to implement a viable keyless entry system combined with a personal authentication system.

Furthermore, as described above, the keyless entry support system 3 changes the diverse boarding environment settings optimally to suit a particular user authenticated in the personal authentication process upon locking or unlocking the vehicle doors.

1.2 Remote Controller

Figure 2:
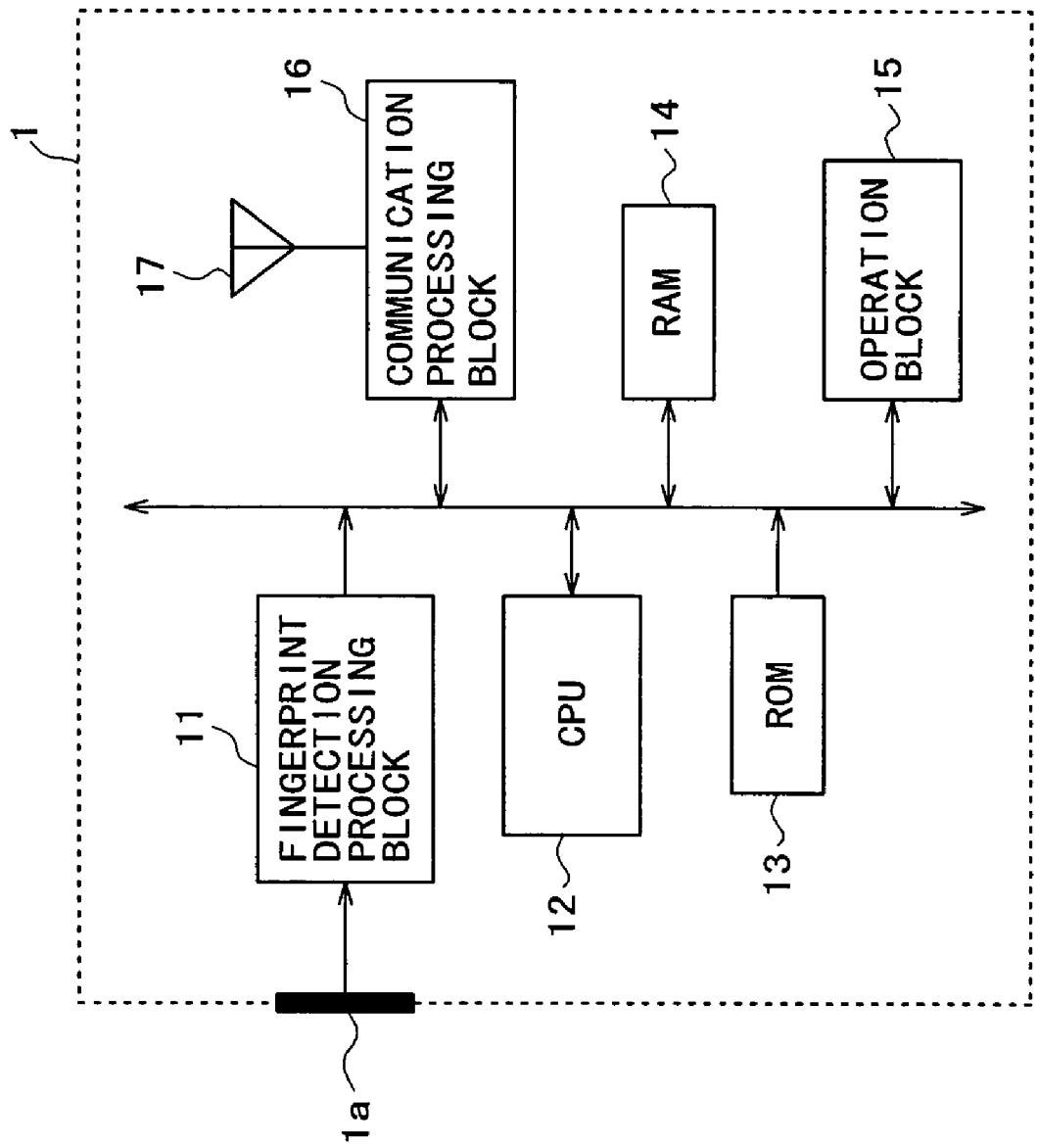
FIG. 2 is a block diagram depicting a typical structure of a remote controller.

FIG. 2 is a block diagram depicting a typical internal structure of the remote controller 1. As illustrated, the user's fingerprint pressed on and detected by the fingertip pressing block 1a of the controller enclosure is converted by a fingerprint detection processing block 11 into detected information (i.e., fingerprint data) in a predetermined digital data format. If the microswitch-based method is adopted, the fingertip pressing block 1a provides numerous pieces of microswitch on/off information reflecting the fingerprint pattern. Using the microswitch on/off information, the fingerprint detection processing block 11 generates fingerprint data as the detected information.

An operation block 15 illustratively represents the locking button 1b and unlocking button 1c shown in FIG. 1. When the locking button 1b or unlocking button 1c is operated, the operation block 15 illustratively transmits to a CPU 12 an operation information signal reflecting the button operation. Based on the transmitted operation information signal, the CPU 12 generates a door locking or unlocking command accordingly. The generated command is sent from a communication processing block 16 to the keyless entry support system 3.

The CPU 12 performs a number of processes in keeping with programs held in a ROM 13 so as to implement the operations of the remote controller 1. Besides the programs to be executed by the CPU 12, the ROM 13 accommodates setting data that are needed by the CPU 12 during its processing. A RAM 14 is used by the CPU 12 during the processing as a work area.

The communication processing block 16 is provided to permit wireless communication with the keyless entry support system 3 on board the vehicle 2. Given outgoing data from the CPU 12, the communication processing block 16 modulates the data using a predetermined carrier and transmits the modulated data illustratively by radio waves from an antenna 17.

This makes it possible to transmit to the keyless entry support system 3 both the fingerprint data detected by the fingerprint detection processing block 11 and the door locking/unlocking command reflecting the operation performed on the operation block 15. In addition to the door locking/unlocking command, it is also possible to transmit to the system 3 commands stipulated according to a specific communication protocol as well as other related data.

The communication processing block 16 is also capable of receiving data from the keyless entry support system 3 and forwarding the received data to the CPU 12. In practice, the communication processing block 16 may initially exchange specific IDs for authentication with the keyless entry support system 3 of a particular vehicle alone.

The wireless communication standards to be actually adopted by a communication processing block 16, and a communication processing block 36 (to be described later) of the keyless entry support system 3 may include, but are not limited to, Bluetooth given the current state of the art. Although not shown, the remote controller 1 incorporates a secondary battery. The remote controller 1 operates from a DC voltage supplied by that battery.

1.3 Keyless Entry Support System

Figure 3:
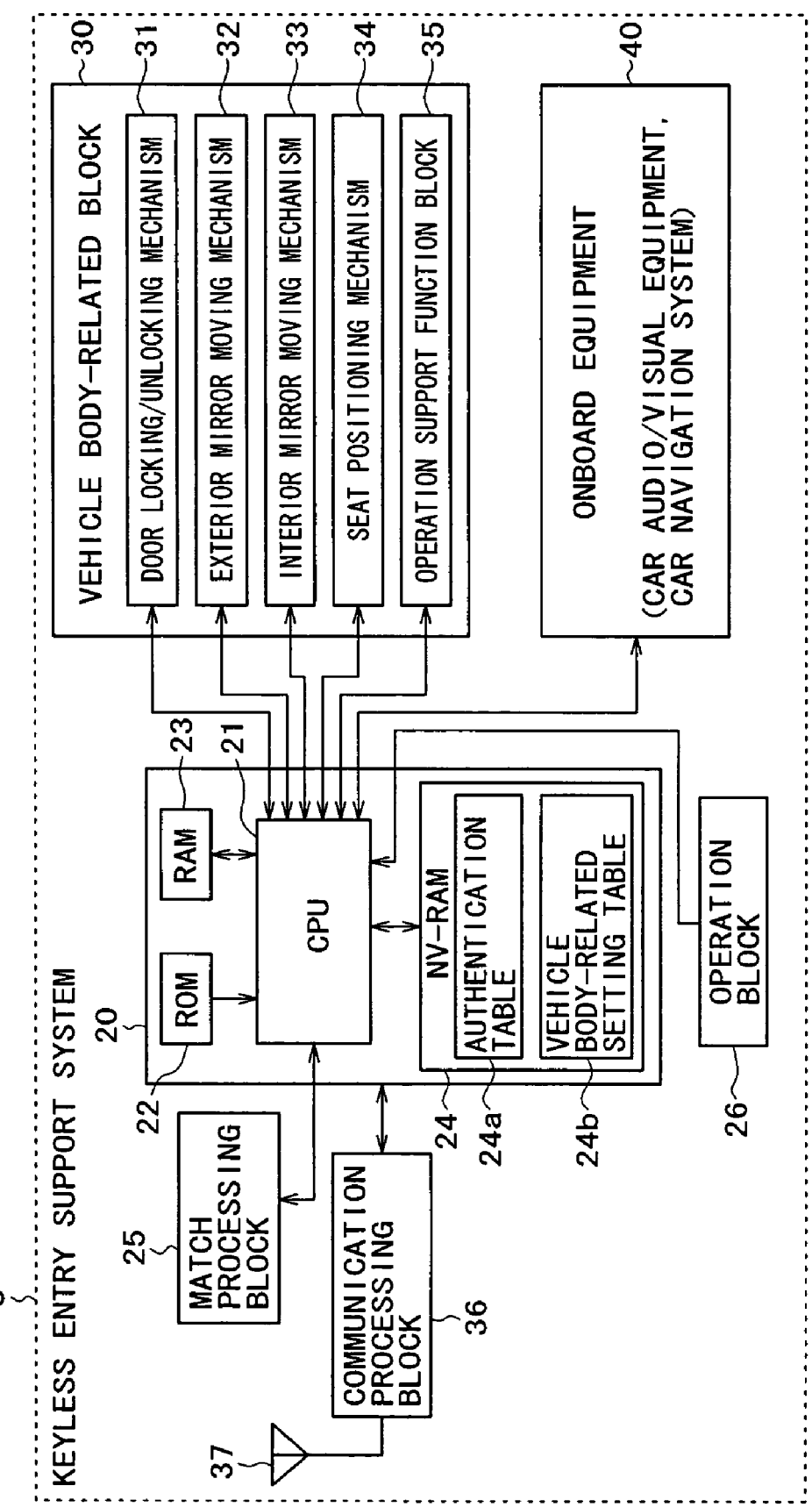
FIG. 3 is a block diagram illustrating a typical structure of a keyless entry support system.

FIG. 3 illustrates a typical structure of the keyless entry support system 3 on board the vehicle 2. As shown in FIG. 3, the keyless entry support system 3 of this embodiment is mainly constituted by a communication processing block 36 connected to an antenna 37, by a central control block 20 including a CPU 21, and by a match processing block 25 connected to the central control block 20. The central control block 20 has under its control a vehicle body-related block 30 and onboard equipment 40.

The communication processing block 36 communicates wirelessly with a specific remote controller 1. Data sent from the remote controller 1 and received by the antenna 37 are demodulated by the communication processing block 36. The demodulated data are forwarded illustratively to the CPU 21 of the central control block 20. Given the data from the communication processing block 36, the CPU 21 carries out necessary processes accordingly.

For data transmission from the communication processing block 36, the CPU 21 of the central control block 20 initially forwards outgoing data to the communication processing block 36 and instructs the latter to transmit the data in question. In response to the instruction, the communication processing block 36 modulates the data from the CPU 21 using a predetermined carrier and transmits the modulated data illustratively by radio waves from the antenna 37 to the remote controller 1.

The central control block 20 controls in centralized fashion the functional operations of the keyless entry support system 3. As depicted in FIG. 3, the central control block 20 includes the CPU 21, a ROM 22, a RAM 23, and an NV (non-volatile)-RAM 24. The CPU 21 carries out diverse control processes illustratively in keeping with programs retained in the ROM 22, thus implementing the operations of the keyless entry support system 3. In addition to the programs to be executed by the CPU 21, the ROM 22 holds setting data for use by the CPU 21 during the processing.

The NV-RAM 24 may have its data inside updated under control of the CPU 21. The NV-RAM 24 is composed of memory elements capable of retaining what is stored thereby when power is removed. In this embodiment, the NV-RAM 24 accommodates various kinds of data registered by each user in connection with relevant system operations of the keyless entry support system 3. Illustratively, as shown in FIG. 3, the NV-RAM 24 stores table data such as an authentication table 24a and a vehicle body-related setting table 24b. Details and uses of the table data will be discussed later in more detail.

The match processing block 25 is provided to execute the personal authentication process based on fingerprint matching. The remote controller 1 transmits fingerprint data detected by the fingerprint detection processing block 11 to the keyless entry support system 3 as needed. When received and acquired by the keyless entry support system 3, the fingerprint data are written by the CPU 21 to the RAM 23 for storage.

Under control of the CPU 21, the match processing block 25 reads the fingerprint data about the target object of authentication from the RAM 23, and checks the data against the fingerprint data previously registered in the authentication table 24a for a match. The result of the check (a match or a mismatch) is reported to the CPU 21.

If the CPU 21 is notified of a match between the fingerprint data about the authentication target object and the previously registered fingerprint data, the CPU 21 recognizes successful personal authentication. If the CPU 21 receives a notice of mismatch between the fingerprint data and the previously registered fingerprint data, then the CPU 21 finds authentication of the person to be unsuccessful.

In this embodiment, the match processing block 25 is furnished as a hardware functional block independent of the central control block 20. However, this is not limitative of the invention. Alternatively, if the CPU 21 has sufficiently high computing power, the functions of the match processing block 25 may be implemented on a software basis by the CPU 21 carrying out appropriate programs.

The operation block 26 is made up of operating elements by which to operate the keyless entry support system 3. Performing an operation on the operation block 26 causes information about the executed operation to be output to the CPU 21. Upon receipt of the operation information, the CPU 21 carries out suitable control processing accordingly so that the system 3 will function as required. Although not shown, the operation block 26 may alternatively be constituted by a remote controller and by a receiver that receives and demodulates signals sent wirelessly from the remote controller before forwarding the demodulated signals to the CPU 21.

When the vehicle doors are unlocked, the above-described central control block 20 executes control to change the boarding environment of the vehicle 2 to suit the person (i.e., user) authenticated in the personal authentication process, as will be discussed later in more detail. The boarding environment to be changed involves two principal categories of settings: vehicle body-related settings such as the mirror positions and the seat position; and onboard equipment-related settings such as those designated by each user or established automatically as per the user's usage history regarding such devices as car audio/video equipment, a car navigation system, and other combination equipment.

The vehicle body-related block 30 and the onboard equipment 40 have their settings changed by the CPU 21 of the central control block 20 controlling the boarding environment of the vehicle 2. The vehicle body-related block 30 is made up of a plurality of mechanisms associated with the vehicle body. These mechanisms function in keeping with the vehicle body-related settings constituting part of the boarding environment. The onboard equipment 40 is a collection of electronic devices mounted on board the vehicle 2. The equipment 40 in this embodiment integrates car audio/video equipment with a car navigation system, whose settings are the onboard equipment-related settings constituting another part of the boarding environment.

As shown in FIG. 3, the vehicle body-related block 30 of this embodiment includes a door locking/unlocking mechanism 31, an exterior mirror moving mechanism 32, an interior mirror moving mechanism 33, a seat positioning mechanism 34, and an operation support function block 35. As its name implies, the door locking/unlocking mechanism 31 is used to lock and unlock the doors of the vehicle 2. The external mirror moving mechanism 32 is designed to adjust electrically the orientations of the exterior mirrors such as the door and fender mirrors. The interior mirror moving mechanism 33 is intended to adjust electrically the orientations of the interior mirrors including the rearview mirror. The seat positioning mechanism 34 is provided to adjust electrically the position of the driver seat. The seat position should be adjustable at least in the forward and backward directions. In addition to the forward and backward directions, the seat position may be adjusted preferably in terms of backrest angle, seat height, and headrest orientation.

The operation support function block 35 is formed by mechanisms for providing operations equivalent to those carried out by the user manipulating specific operating elements furnished in the interior of the vehicle 2. These mechanisms may include one corresponding to a trunk lever operated to open the trunk, and another representative of a so-called panic button operated by the driver signaling an emergency situation to passersby.

1.4 Onboard Equipment

Figure 4:
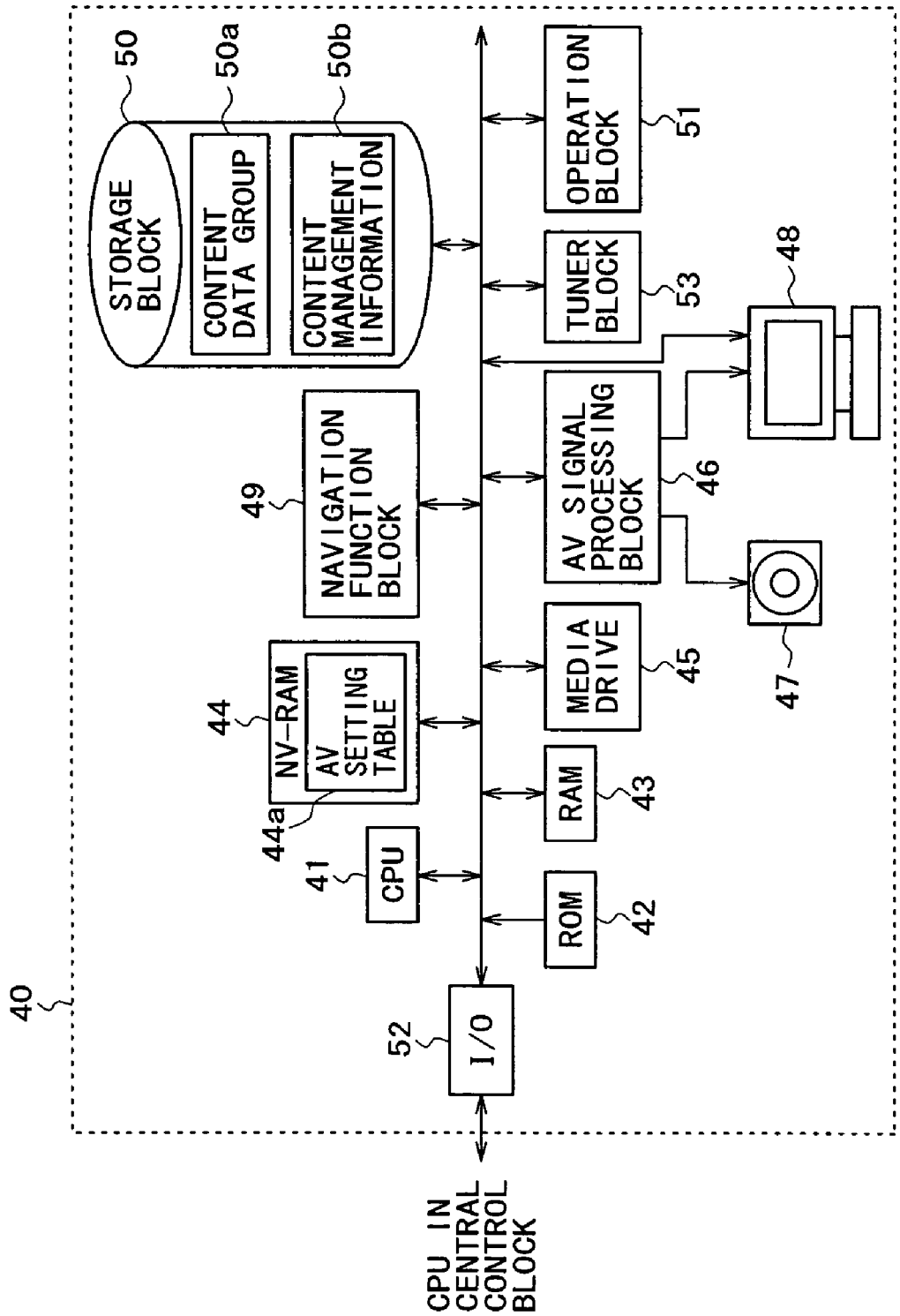
FIG. 4 is a block diagram indicating a typical structure of onboard equipment.

An internal structure of the onboard equipment 40 included in FIG. 3 will now be described by referring to FIG. 4. As mentioned above, the onboard equipment 40 is a combination of car audio/video equipment with a car navigation system. The onboard equipment 40 includes an interface 52 that ensures communication with the CPU 21 of the central control block 20 via a data bus, as illustrated.

A CPU 41 in the onboard equipment 40 carries out necessary control processes for the equipment 40 to execute its operations. The processing of the CPU 41 is performed illustratively using programs retained in a ROM 42. The programs to be executed by the CPU 41 may alternatively be held in a storage block 50, to be described later. In addition to the data constituting the programs for use by the CPU 41, the ROM 42 accommodates setting data utilized by the CPU 41 during its processing. A RAM 43 is used by the CPU 41 as a work area during the processing.

An NV-RAM 44 has various user-established data items written therein. Illustratively the NV-RAM 44 contains an AV setting table 44a as indicated. Details and uses of the AV setting table 44a will be described later.

A media drive 45 accommodates predetermined types of media. The media drive 45 can read data from a recording medium loaded therein. The media drive 45 may further write data to a recordable medium loaded therein.

The media drive 45 and an AV signal processing block 46 combine to provide the functions of car audio/video equipment as part of the onboard equipment 40. More specifically, when a medium carrying audio or video data is loaded into the media drive 45, the audio or video data are read from the loaded medium and fed to the AV signal processing block 46 via an internal data bus.

When supplied with the audio data, the AV signal processing block 46 subjects the data to a suitable decoding process and a digital-to-analog conversion process. The data thus processed are output from the processing block 46 to speakers 47, whereby the audio data read by the media drive 45 from the loaded medium are reproduced and output as sounds.

When supplied with the video data, the AV signal processing block 46 subjects the data to a suitable decoding process and outputs the processed data to a display unit 48 as video signals in a predetermined format. In turn, the display unit 48 displays pictures based on the input video signals. That is, the video data read by the media drive 45 from the loaded medium are reproduced and output as pictures.

The media to be addressed by the media drive 45 may include, but are not limited to, disc media such as CD-ROM and DVD-ROM. Other media composed illustratively of memory elements may also be addressed by the media drive 45.

As one of its car audio/video equipment functions, the onboard equipment 40 of this embodiment is capable of storing a large number of audio (or video) data items in the form of a content data group 50*a* in a storage block 50. The storage block 50 should preferably be constituted by a mass storage medium such as a hard disc drive (HDD) of a required storage capacity, given the current state of the art.

When a recording medium carrying audio (or video) data is loaded into the media drive 45, the audio (or video) data are read from the loaded medium. The audio (or video) data thus retrieved are transferred to the storage block 50 via the data bus. In the storage block 50, the data are retained as content data making up the content data group 50*a*. The retrieval of content data from the media and the writing of the retrieved data to the storage block 50 may be accomplished automatically in the background under control of the CPU 41, i.e., without the user's intervention.

The content data group 50*a* is managed illustratively by use of content management information 50*b* held in the same storage block 50. The content management information 50*b* is arranged to constitute a file system in compliance with a predetermined standard. As such, the content management information 50*b* includes the recorded location in the storage block 50 of each of the content data items (files) as well as additional information about each content data item (file). On the basis of such content management information 50*b*, the CPU 41 controls the writing and reading of content data (audio or video data) to and from the storage block 50.

Suppose that a user performs operations to reproduce content data held in the storage block 50. In that case, the CPU 41 executes a control process to read the content data in question from the storage block 50. More specifically, the CPU 41 references the content management information 50*b* forming the file system in order to read the target content data from the content data group 50*a*. The retrieved content data are transferred to the AV signal processing block 46 over the data bus.

Given the input content data (audio or video data), the AV signal processing block 46 decodes the data as discussed above. If the input data are audio data, the data derived from the decoding process are output as analog audio signals to the speakers 47; if the input data are audio data, the decoded data are output as video signals to the display unit 48. In this manner, the content data held in the storage block 50 can also be retrieved and output as sounds or pictures.

As another car audio function, the onboard equipment 40 incorporates a tuner block 53. The tuner block 53 illustratively receives and demodulates FM/AM broadcast waves and outputs the resulting audio data to the AV signal processing block 46. While the tuner block 53 is being selected as an active function, the AV signal processing block 46 converts the audio data coming from the tuner block 53 into analog audio signals that are sent to the speakers 47 for output as sounds.

An operation block 51 illustratively includes a number of operating elements that are provided on the body of the onboard equipment 40. When any one of these elements is operated, the operation block 51 outputs information denoting the operation to the CPU 41. Given the operation information, the CPU 41 carries out a control process triggering the corresponding system operation.

The operation block 51 may also be constituted by a remote controller and by a receiver that receives and demodulates signals sent wirelessly from the remote controller before forwarding the demodulated signals to the CPU 41. With this embodiment, the operation block 26 furnished as part of the keyless entry support system 3 shown in FIG. 3 may take over the functions of the operation block 51 of the onboard equipment 40, thus eliminating the latter block 51. This alternative structure allows the user to operate the onboard equipment 40 by manipulating the operation block 26.

A navigation function block 49 is made of components constituting a navigation system that forms part of the onboard equipment 40. More specifically, the navigation function block 49 incorporates illustratively a current position detecting system compatible with GPS (global positioning system). In this setup, map information may be acquired illustratively by the media drive 45 retrieving the information from the loaded medium. It is also possible to have the map information retained in a storage block 50, to be discussed later, for retrieval upon positioning.

Needless to say, the media drive 45 may be used exclusively with the car audio/video devices. The navigation function block 49 may then possess its own media drive or HDD for accommodating map information that is reproduced for navigation use. In operation, the navigation function block 49 detects the vehicle's current position using the internal current position detecting system and acquires map information from the loaded medium in order to give various navigation-oriented displays illustratively on the display unit 48.

2. Outline of System Operations

Figure 5:
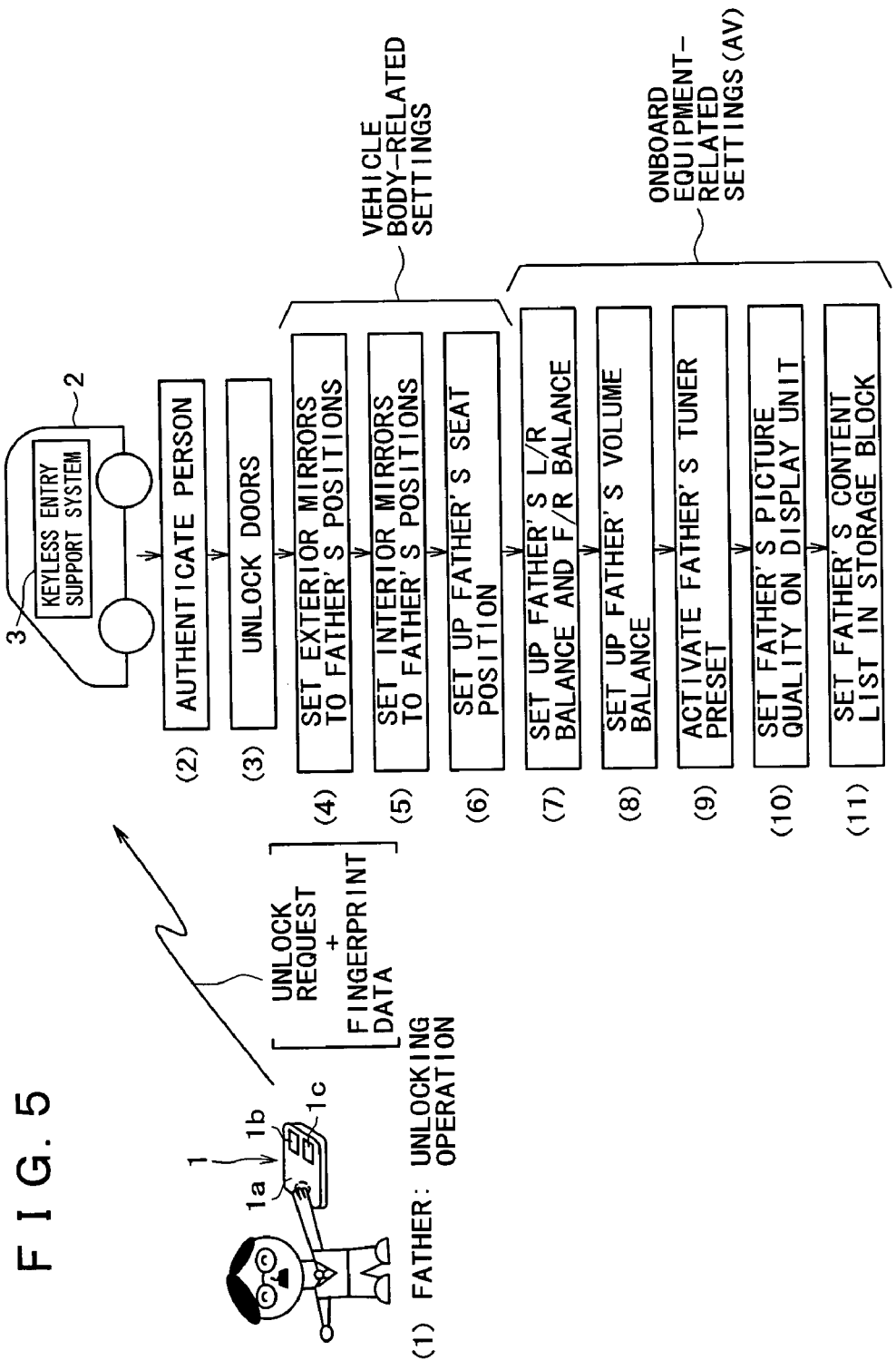
FIG. 5 is an explanatory view outlining operations of the inventive keyless entry system unlocking vehicle doors.

Described below with reference to FIG. 5 is an outline of how the above-described keyless entry system of this embodiment works. FIG. 5 shows a user (father in this example) gripping in his hand the remote controller 1 that forms part of the inventive keyless entry system. As discussed above, there may be a plurality of users registered with this system. In the description that follows, it is assumed that at least the father is registered as a user with the keyless entry support system 3 on board the vehicle 2. In practice, not only the father but also his family members (i.e., his wife, son, daughter, etc.) may be registered as users.

Registration in this context has two meanings. On the one hand, a "registered" user means that his or her fingerprint has been recorded in advance for personal authentication purposes. On the other hand, registering, say, the father as a user with the system means that the father's fingerprint data for personal authentication are associated in storage with the setting data on the vehicle body-related block 30 and onboard equipment 40 making up the father's boarding environment for driving. What follows is a more detailed description of the steps outlined in FIG. 5, with their numbers shown encircled.

Step 1: In the setup of FIG. 5, the user (i.e., father) operates the remote controller 1 to unlock the vehicle doors before getting in and driving the vehicle 2. In this step, the user operates the unlocking button 1c while pressing his fingertip onto the fingertip pressing block 1a in such a manner as to let the remote controller 1 pick up his fingerprint. In response to the user's operation, the remote controller 1 transmits an unlock request command, together with the fingerprint data detected by the fingerprint detection processing block 11 from the user's fingertip on the fingertip pressing block 1a.

Step 2: The keyless entry support system 3 of the vehicle 2 receives and acquires the unlock request command and fingerprint data. In response to the received command, the system 3 checks the acquired fingerprint data against the previously registered fingerprint data of legitimate users for a match. The matching process is carried out by the match processing block 25 as described above with reference to FIG. 3. Since the user (i.e., father) has his fingerprint data already registered, the check in this step results in a match. This means that the user is successfully authenticated.

Step 3: Following the successful personal authentication, the keyless entry support system 3 unlocks illustratively the doors of the vehicle 2.

Step 4: This and the subsequent steps constitute a procedure for establishing the boarding environment corresponding to the authenticated user based on the setting data registered beforehand. Steps 4, 5 and 6 are carried out to change the settings related to the body of the vehicle 2 as part of the boarding environment changing procedure. In step 4, the exterior mirrors are set to the father's positions.

Step 5: In this step, the interior mirrors are set to the father's positions.

Step 6: In this setup, the father's driver seat position is established.

Step 7: Steps 7 through 11 are carried out to change the settings related to the onboard equipment 40 as part of the boarding environment changing procedure. The speakers 47 shown in FIG. 4 are assumed here to include four speaker units, two in the front (i.e., a left-hand (L) and a right-hand (R) channel speaker) and another two in the rear (a left-hand (L) and a right-hand (R) channel speaker). In step 7, the father's right-left (L/R) balance settings about the four speaker units are established, and his front-rear (F/R) balance settings about the speakers 47 are also set up.

Step 8: In this step, the father's volume balance settings about the speakers 47 are established.

Step 9: Most radio tuners marketed in recent years allow users to preset the frequencies of desired radio stations. After the presetting, the user need only operate a tuner key to tune in to any favorite station. The tuner block 53 in the onboard equipment 40 of this embodiment in FIG. 4 also offers the radio station preset feature. The tuner block 53 further allows each of a plurality of users to preset separately the frequencies of his or her desired radio stations. In step 9, the father's tuner preset specifying the selected radio station frequencies on the tuner block 53 is activated.

Step 10: The user may change the picture quality on the display unit 48 in terms of brightness, tone and other factors to reflect his or her preferences illustratively under control of the CPU 41. The user-specific picture quality settings are registered in association with each of the registered users. In this step, the father's picture quality on the display unit 48 is established in accordance with the picture quality settings registered beforehand in association with the father.

Step 11: The content data group 50a in the storage block 50 of the onboard equipment 40 shown in FIG. 4 is managed by use of the content management information 50b. The content management information 50b allows the content list registered for each user for personal authentication to manage the content data group 50a. More specifically, the content data items making up the content data group 50a are stored and managed in directories that are assigned apparently to each of the users involved.

In step 11, the father's content list is set to establish association with the corresponding content data in the storage block 50. Thereafter, content data items start getting reproduced from the storage block 50 in keeping with the father's content list. When a specific user's content list is established in step 11, the sequence of reproducing content data items may reflect the reproduction frequencies recorded in that user's content list. Illustratively, content data items may be reproduced automatically in the descending order of their reproduction frequencies listed in the corresponding content list.

With this embodiment, as described, the user is first authenticated when operating the remote controller 1 to unlock the vehicle doors. The doors are unlocked only after the user has been successfully authenticated. This feature reinforces the level of security with the keyless entry system. Once the user is authenticated and identified, the boarding environment (i.e., various settings) of the vehicle 2 is automatically changed to suit the user. In other words, when a specific user unlocks the vehicle doors by operating the remote controller 1 and gets into the vehicle 2 to drive, the diverse vehicle settings are automatically adjusted to reflect the user's preferences.

Conventionally, when getting into the vehicle driven previously by some other user, the user had to readjust by himself the seat position and the exterior and interior mirror orientations preparatory to driving the vehicle. Other settings on the onboard equipment had to be readjusted as well. These modifications often turned out to be troublesome.

This embodiment, by contrast, provides automatic change of the settings constituting the boarding environment for each user upon entry into the vehicle. This frees the vehicle users from the readjusting chores they went through conventionally, thereby making the preparations for driving easier and more convenient.

In practice, it is often the case that the driver becomes aware of some unfit settings of his or her boarding environment only after starting to drive the vehicle. Some drivers then change the settings while driving, which can be dangerous. According to the invention, by contrast, the settings have been optimized by the time the driver unlocks and starts up the vehicle. Eliminating the need for setting changes during driving contributes significantly to safer driving.

The setting steps outlined in FIG. 5 (steps 4 through 11) are only for illustration purposes. In practice, these steps may be modified as needed in their details and may be carried out in a sequence different from that discussed above depending on the actual use conditions.

3. Data Structures

What follows is a description of typical data structures needed technically to implement the operations of the keyless entry system embodying the invention and outlined in FIG. 5. First to be described are some data and their structures for use by the inventive keyless entry system carrying out its operations.

FIGS. 6A and 6B show an authentication table 24a and a vehicle body-related setting table 24b respectively. These tables list information stored in the NV-RAM 24 of the keyless entry support system 3.

The authentication table 24a in FIG. 6A lists the information created by the users when they register for personal authentication in preparation for driving the vehicle 2. When registering for personal authentication, each user designates the start of registration by operating illustratively the operation block 26 of the keyless entry support system 3. In response to the user's operation, the keyless entry support system 3 (CPU 21 of the central control block 20) transmits a fingerprint data request command to the remote controller 1. At this point, the user places his or her fingertip on the fingertip pressing block 1a of the remote controller 1 in such a manner as to let the fingerprint be detected properly. Upon receipt of the fingerprint data request command, the remote controller 1 gets the fingerprint detection processing block 11 to pick up the user's fingerprint and generate fingerprint data accordingly. The fingerprint data thus generated are sent to the keyless entry support system 3.

On receiving the fingerprint data, the keyless entry support system 3 (CPU 21 of the central control block 20) establishes a new user ID for the currently registering user. The system 3 causes the display unit 48 to display a user interface picture or like indications prompting the user to input a password. The user then enters an appropriate password by operating the operation block 26.

The processing above provides one set of registered data: a user ID, fingerprint data, and a password. The keyless entry support system 3 associates these pieces of data with one another, before writing the whole data set into the authentication table 24a. The processing is carried out for each of a plurality of users who want to register for personal authentication.

The vehicle body-related setting table 24b, as shown in FIG. 6B, is made up of exterior mirror position information, interior mirror position information, and seat position information with regard to each user ID. That is, the table 24b contains information representing the settings of the exterior mirror moving mechanism 32, interior mirror moving mechanism 33, and seat positioning mechanism 34 constituting the boarding environment of each registered user.

Information to be written into the vehicle body-related setting table 24b is created for each user who has registered for personal authentication and who wants to store the desired boarding environment associated with the vehicle body. For example, the user first sits on the driver seat and, in that state, adjusts the exterior mirrors, interior mirrors, and seat position in keeping with his or her preferences. The user then enters the password and performs operations to register the vehicle body settings denoting his or her optimally adjusted boarding environment. In turn, the CPU 21 of the central control block 20 acquires the information representative of the current exterior mirror positions, interior mirror positions, and seat position from the exterior mirror moving mechanism 32, interior mirror moving mechanism 33, and seat positioning mechanism 34 respectively. That is, the system 3 acquires the exterior mirror position information, interior mirror position information, and seat position information.

Initially, the CPU 21 references the authentication table 24a in recognizing the user ID associated with the input password. The CPU 21 then associates the recognized user ID with the exterior mirror position information, interior mirror position information, and seat position information acquired earlier, and stores these pieces of information in combination into the vehicle body-related setting table 24b.

Figure 7:
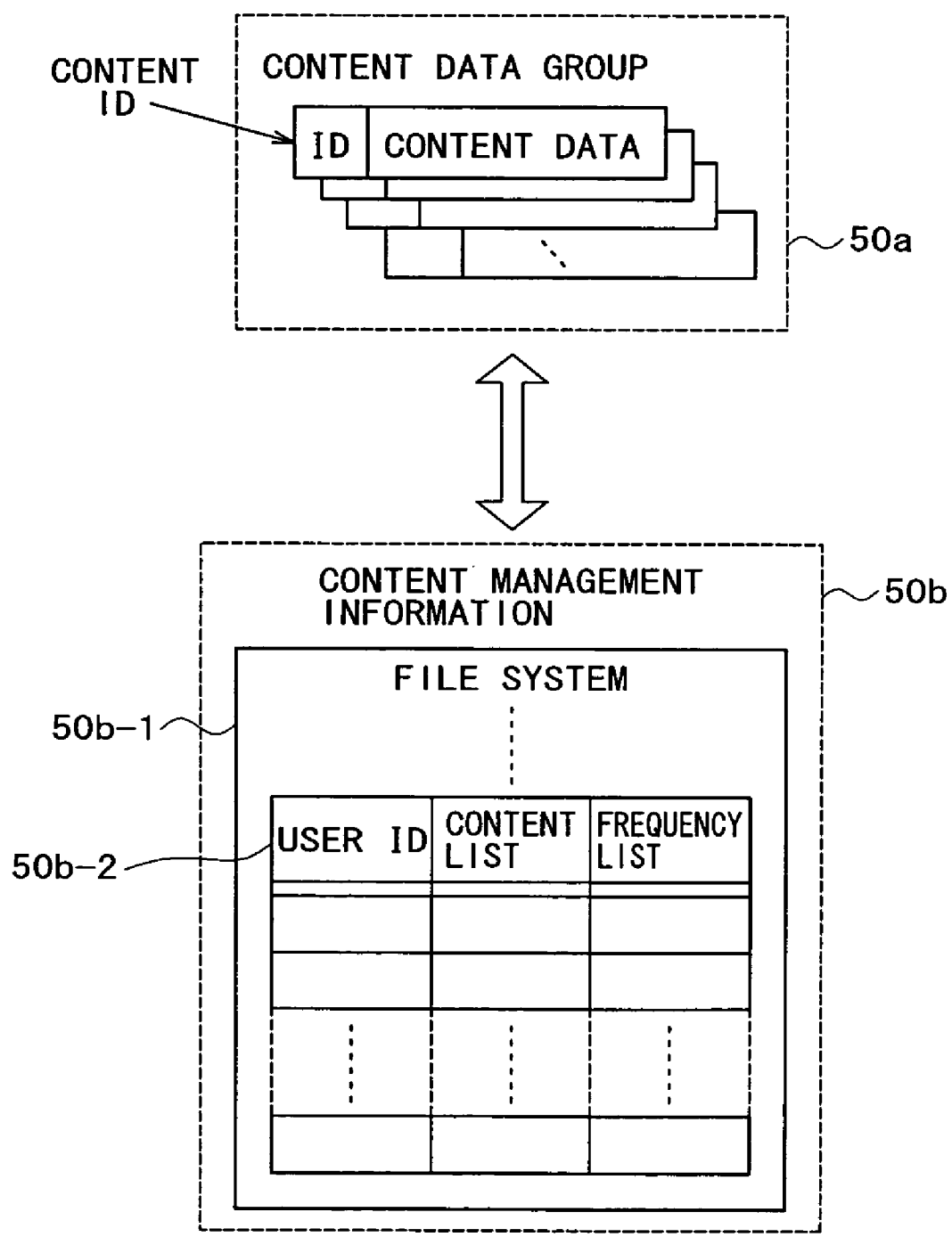
FIG. 7 is a schematic view sketching a typical structure of a user content list table as part of content management information.

Described below with reference to FIG. 7 is the content management information 50b as it is structured to let the content data group 50a in the storage block 50 be managed in accordance with the content list established for each of the registered users. As mentioned above, the content management information 50b held in the storage block 50 constitutes a file system that manages on a file-by-file basis the content data group 50a stored in the same storage block 50.

More specifically, as shown in FIG. 7, individual content data items making up the content data group 50a are each stored in the storage block 50 as a file with its header area including a content ID. In practice, the content management information 50b includes a file system 50b-1 designed to manage the content data items.

The file system 50b-1 retains the recorded location of each of the content data items (files) in the storage block 50, as well as additional information about each content data item (file). The additional information illustratively includes: the size of each content data item (file), reproduction time of each file, name of each file (i.e., title), album title of the recording medium carrying the content data item in question, names of performers associated with the content in the file, and genre of the content. In many cases, the audio or video data stored on the hard disc drive are compressed. In such cases, the compression format and compression rate in use are also included in the additional information.

This embodiment further includes a user content list table 50b-2 for managing content data in user-specific fashion in conjunction with the file system 50b-1. As illustrated, the user content list table 50b-2 is structured to associate a content list and a frequency list with each user ID.

Each of the content lists in the user content list table 50b-2 is made up of content IDs which denote some content data items found in the content data group 50a and which are associated with a single user ID. The content IDs representative of content data items may be listed typically in the content list as shown in FIG. 8A.

Content IDs may be written to a content list illustratively by the user manually operating the onboard equipment 40. Alternatively, this embodiment may carry out the listing process automatically. For example, when unlocking the vehicle doors by operating the remote controller 1, the user is first authenticated in the personal authentication process and is recognized as an authorized driver. The content data brought at this point into the storage block 50 are considered to belong to the currently authenticated user. The content IDs of the acquired content data items are then written automatically to the content list associated with the user ID of the user in question.

Each of the frequency lists in the user content list table 50b-2 provides information designed to manage user-specific content data items in each content list in a manner reflecting how many times each of the data items has been reproduced so far by the user in question. As depicted in FIG. 8B, each frequency list associates each content ID with the number of times the corresponding data item has been reproduced. The content IDs are then managed in the descending order of the frequencies of their corresponding content data items.

The user content list table 50*b*-2 thus makes it possible to structure each of the user-specific content lists in a manner reflecting how many times each of the listed content data items has been reproduced. When the content list of a specific user is invoked for sequential content reproduction, the listed content data items can be reproduced in the descending order of their past reproduction frequencies.

Described below with reference to FIG. 9 is the AV setting table 44*a* retained in the NV-RAM 44 of the onboard equipment 40. The AV setting table 44*a* is a table that is referenced in the above-described steps 7 through 9 of FIG. 5 carried out to change the onboard equipment-related settings.

As illustrated in FIG. 9, the AV setting table 44*a* is structured to accommodate such information as the L/R balance, F/R balance, volume, tuner preset, and picture quality setting information in conjunction with each user ID. The L/R balance and F/R balance are information constituted by the left-right and front-rear balance settings of sound output from the speakers 47. The volume is information about the settings of sound volume from the speakers 47. The tuner preset is information about at least one selected radio station frequency to be preset on the tuner block 53. The picture quality setting information is information formed by the settings of brightness, sharpness, tone, and other parameters for adjusting picture quality on the display unit 48.

4. Processing Operations

Described below are typical processing operations carried out by the keyless entry system embodying this invention, the description being based on the above-mentioned structure of the embodiment as well as on the data structure examples for use therewith.

To let the inventive keyless entry system change the settings upon unlocking requires that an authentication table be created by registration of a user for personal authentication. The processing operations necessary for user registration are described below with reference to FIG. 10.

Figure 10:
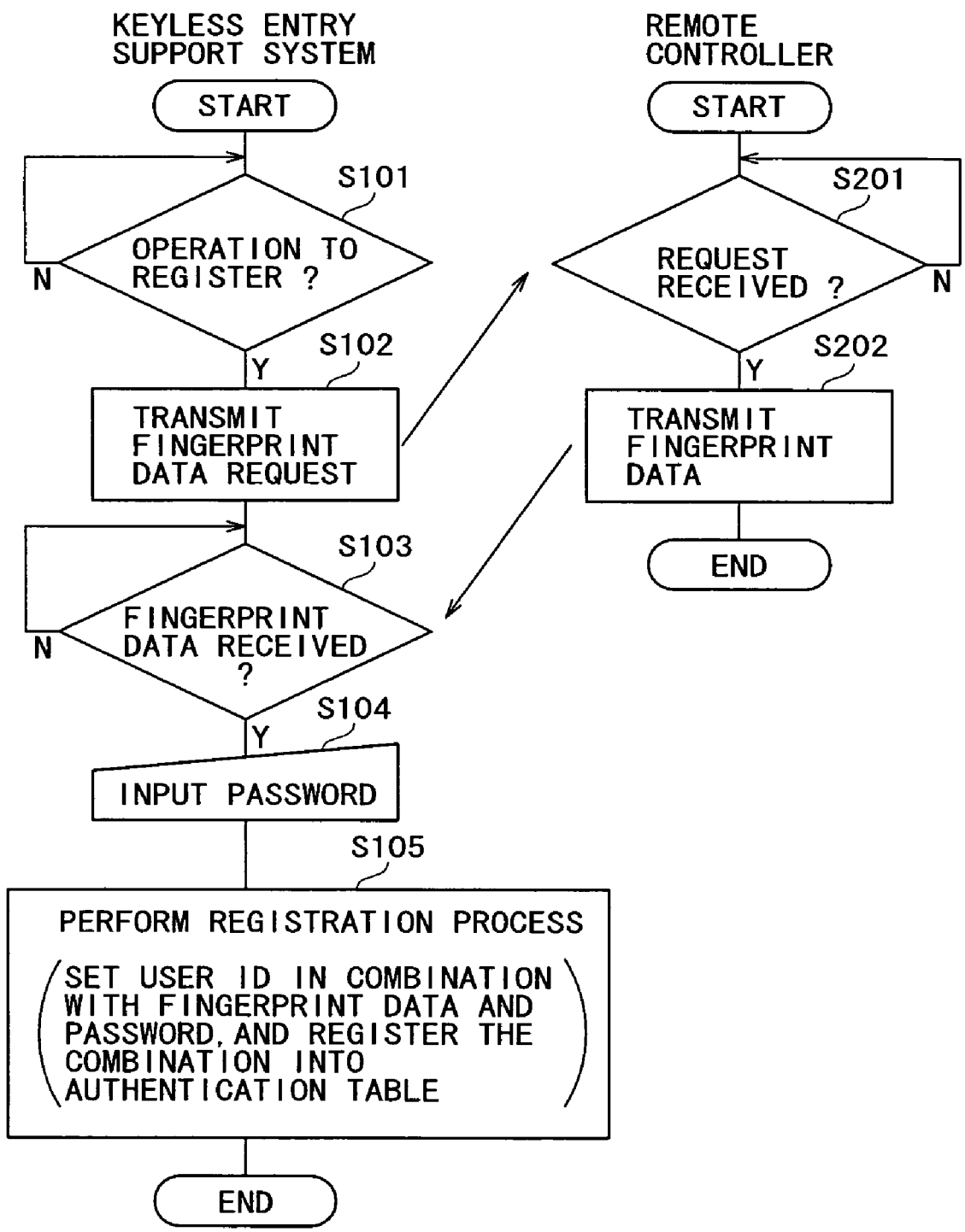
FIG. 10 is a flowchart of steps constituting a user registration process for personal authentication.

The processing in FIG. 10 is executed by the keyless entry support system 3 on board the vehicle 2 and by the remote controller 1 working in collaboration. More specifically, the processing on the part of the keyless entry support system 3 is carried out by the CPU 21 of the central control system 20 (see FIG. 3), and the processing on the part of the remote controller 1 is performed by the CPU 12 (see FIG. 2).

In step S101, the CPU 21 of the keyless entry support system 3 waits for a user to perform an operation to start registering for personal authentication. When the registration starting operation is performed on the operation block 26 of the keyless entry support system 3, information denoting the operation is input to the CPU 21. The information input brings about an affirmative result of the check in step S101, which leads to step S102.

In step S102, the CPU 21 transmits a fingerprint data request command to the remote controller 1.

In step S201, the CPU 12 of the remote controller 1 waits for the fingerprint data request command to come in. Upon verifying receipt of the request command, the CPU 12 goes to step S202. At this point, as discussed above, the user presses his or her fingertip onto the fingertip pressing block 1*a* of the remote controller 1. The fingerprint detection processing block 11 of the remote controller 1 picks up the user's fingerprint and generates fingerprint data accordingly.

In step S202, the fingerprint data thus generated are transmitted from the CPU 12 to the keyless entry support system 3.

In step S103, the CPU 21 of the keyless entry support system 3 waits for the fingerprint data to arrive. When the fingerprint data are found to be received, the CPU 21 goes to step S104.

In step S104, the CPU 21 causes the display unit 48 illustratively to display a user interface picture prompting the user to input a password. The CPU 21 remains ready to execute a process for retaining a password that will be entered by the user through the operation block 26.

With the password input, step S105 is reached. In step S105, the CPU 21 establishes a new user ID corresponding to the ongoing registration. The CPU 21 then stores into an authentication table 24*a* the newly established user ID in association with the fingerprint data received in step S103 as well as the password entered in step S104. This creates one (more) authentication table 24*a* having relevant information corresponding to one (more) user ID.

Alternatively, the keyless entry support system 3 may accept input of information other than the password as part of the processing in FIG. 10. For example, the user may be allowed to enter his or her own user name. Where the vehicle 2 is shared illustratively by family members, the father may input a desired user name like "Dad" in characters when registering as a legitimate user.

In the process of step S105 above, the user name may be registered in association with the user ID, fingerprint data, and password. The associative registration of the user name allows the system to present an appropriate user interface corresponding to each specific user name. This helps the user subsequently to proceed more easily with an application for establishing desired settings.

Figure 11:
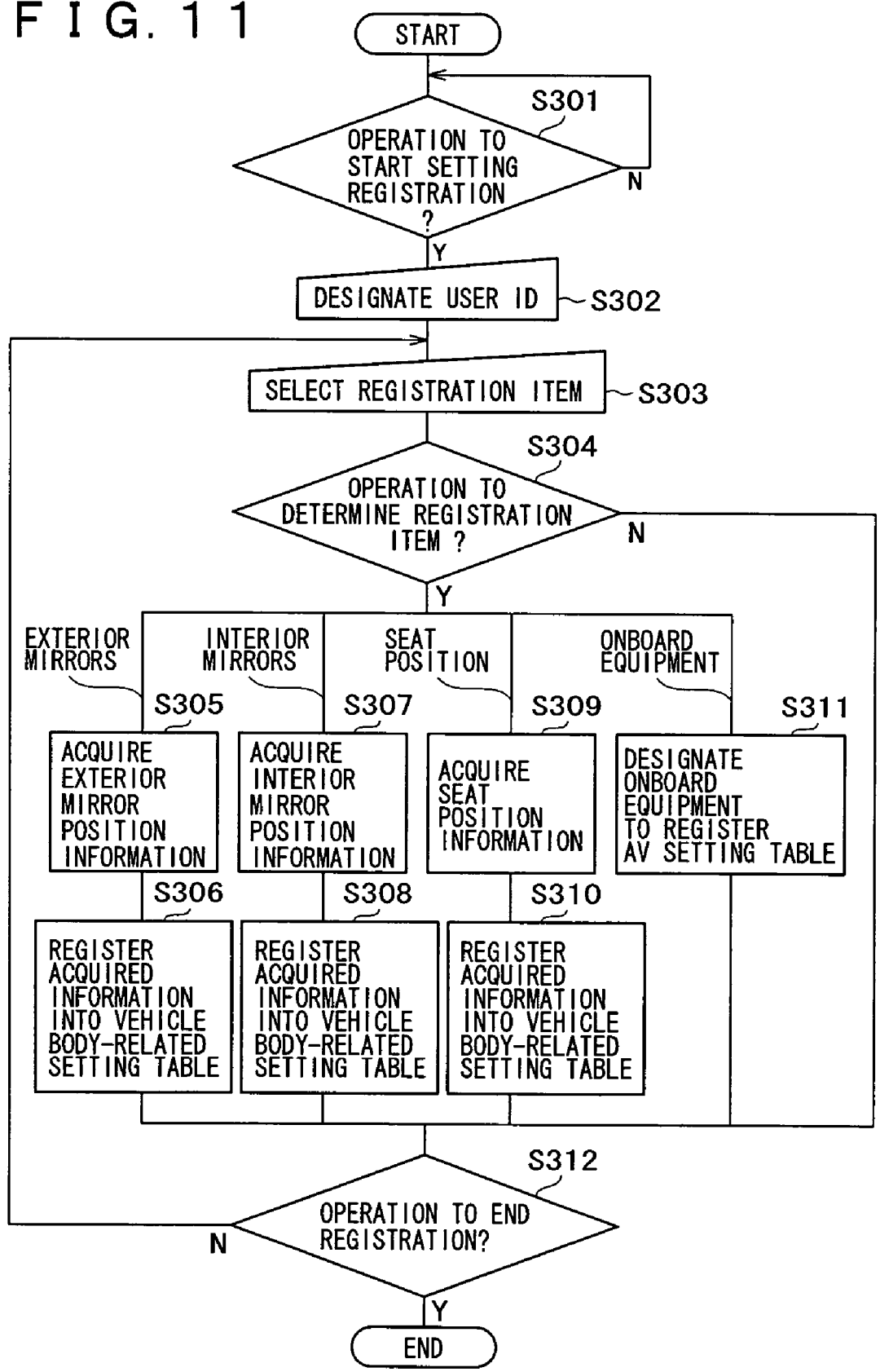
FIG. 11 is a flowchart of steps constituting a user-specific boarding environment registration process.

With the user registration carried out for personal authentication, it is necessary for the user in question to register beforehand a desired boarding environment (settings) that is to be invoked upon subsequent use of the vehicle. The processing operations for boarding environment registration are described below with reference to FIG. 11. The processing in FIG. 11 is carried out by the CPU 21 of the central control block 20 in the keyless entry support system 3.

In step S301, the CPU 21 waits for an operation to start registering the settings (i.e., boarding environment). Illustratively, when the operation block 26 is operated by the user starting to register preferred settings, information denoting the operation is input to the CPU 21. Thus causes the CPU 21 to go to step S302.

In step S302, the CPU 21 causes the display unit 48 illustratively to display a user interface picture in which the currently registering user identifies himself or herself. The user interface pictures may be arranged for the user's identification based on the above-mentioned user name. When the user has identified himself or herself through this user interface picture by operating the operation block 26, the CPU 21 designates a suitable user ID.

With the user ID thus designated, the CPU 21 goes to step S303 and causes a user interface picture in which to select a registration item to be displayed (i.e., registration item selection picture). In the registration item selection picture, the user selects a desired registration item by operating the operation block 26. Step S303 is repeated until a registration item determining operation is performed in step S304 and a registration ending operation is carried out in step S312, as will be described later. In other words, the user may selectively change the registration item before carrying out the operation item determining operation.

When the registration item determining operation is found executed in step S304, the CPU 21 goes to one of steps S305, S307, S308, and S311 depending on the selected registration item.

If the registration item determined in step S304 turns out to be the exterior mirrors, step S305 is reached. In step S305, the CPU 21 acquires the current exterior mirror position information from the exterior mirror moving mechanism 32 in the vehicle body-related block 30. In step S306, the CPU 21 stores into the vehicle body-related setting table 24b the exterior mirror position information in association with the user ID designated in step S302 earlier.

If the registration item determined in step S304 turns out to be the interior mirrors, step S307 is reached. In step S307, the CPU 21 acquires the current interior mirror position information from the interior mirror moving mechanism 33 in the vehicle body-related block 30. In step S308 following step S307, the CPU 21 stores into the vehicle body-related setting table 24b the interior mirror position information in association with the same user ID designated in step S302.

If the registration item determined in step S304 turns out to be the seat position, step S309 is reached. In step S309, the CPU 21 acquires the current seat position information from the seat positioning mechanism 34. In step S310 following step S309, the CPU 21 stores into the vehicle body-related setting table 24b the seat position information in association with the same user ID.

In the manner described, the vehicle body-related setting table 24b is set to accommodate the setting information related to the vehicle body (i.e., exterior mirror position information, interior mirror position information, and seat position information) associated with a single user ID.

If the registration item determined in step S304 turns out to be the AV setting item related to the onboard equipment 40, then step S311 is reached. Where the registration item is the AV setting item of the onboard equipment 40, necessary information needs to be written to the AV setting table 44a of the onboard equipment 40. In step S311, the CPU 21 transmits a command to the CPU 41 of the onboard equipment 40 instructing the latter to write the setting information into the AV setting table 44a. The command is transmitted along with the user ID designated in step S302 earlier.

The CPU 41 of the onboard equipment 40 performs processing, not shown in any flowchart, in response to the above instruction that the setting information is to be written to the AV setting table 44a. The processing roughly proceeds as follows:

The CPU 41 acquires the current L/R balance, F/R balance, and volume settings illustratively from the AV signal processing block 46. The CPU 41 also acquires the preset data about the currently selected radio station frequencies on the tuner block 53. The CPU 41 further acquires the settings for adjusting the current picture quality on the display unit 48. The acquired information (i.e., L/R balance, F/R balance, volume, and tuner preset information, as well as picture quality setting information) is stored into the AV setting table 44a in association with the user ID received earlier along with the command. Through the processing above, the setting information corresponding to each user ID is written to and retained by the AV setting table 44a shown in FIG. 9.

Figure 12:
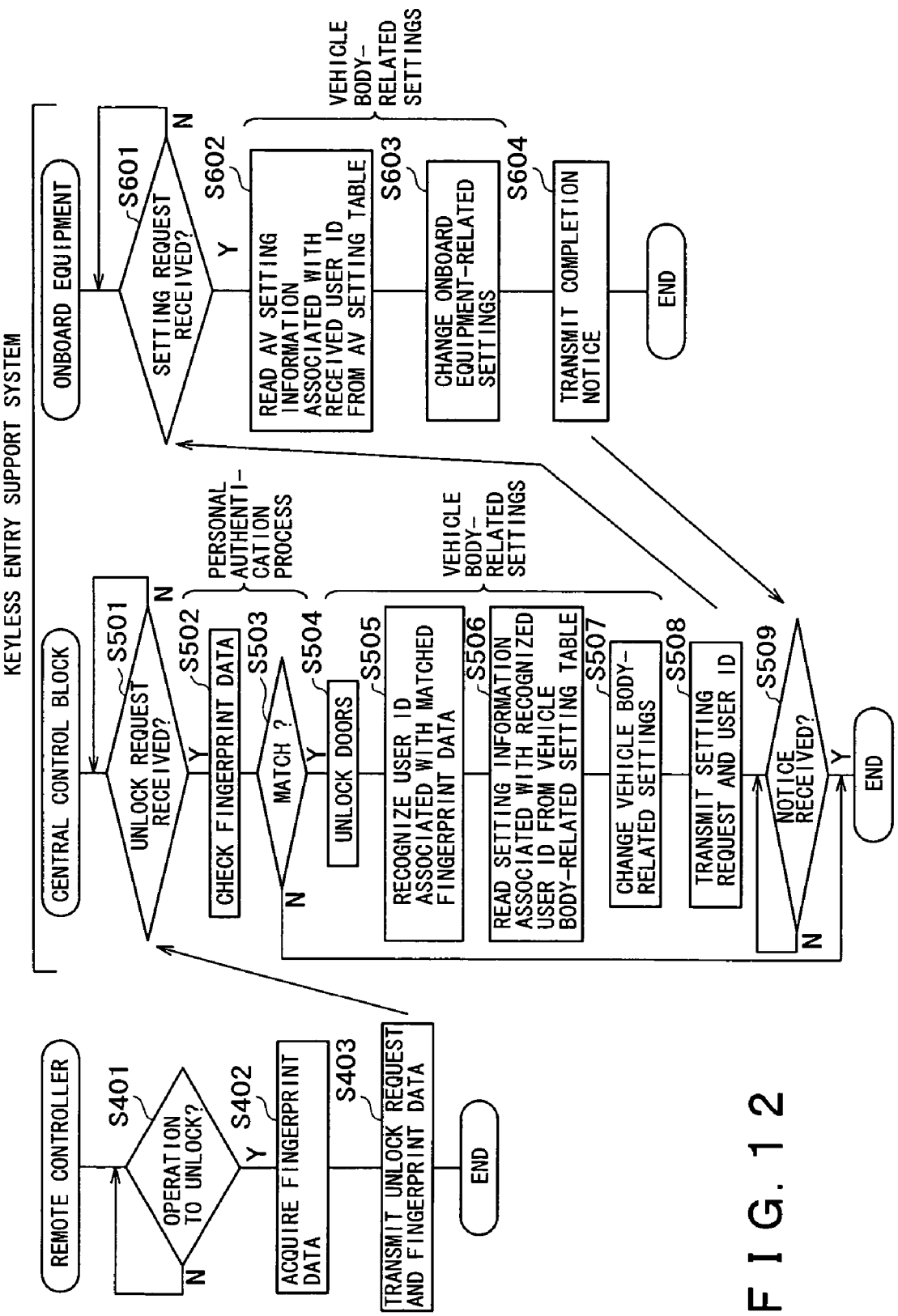
FIG. 12 is a flowchart of steps constituting a boarding environment change controlling process performed when vehicle doors are unlocked.

Described below with reference to FIG. 12 is how the keyless entry system works in response to the operation carried out on the remote controller 1 to unlock the vehicle doors. The processing in FIG. 12 is executed by the CPU 12 of the remote controller 1, as well as by the CPU 21 of the central control block 20 and by the CPU 41 of the onboard equipment 40 working in collaboration in the keyless entry support system 3.

In step S401, the CPU 12 of the remote controller 1 waits for an operation to be performed to unlock the doors. More specifically, the CPU 12 waits for the user to operate the unlocking button 1c on the remote controller 1. When the unlocking button 1c is found to be operated, step S402 is reached.

In step S402, the CPU 12 acquires fingerprint data. Specifically, upon operating the unlocking button 1c of the remote controller 1, the user is expected to press his or her fingertip onto the fingertip pressing block 1a in a manner permitting fingertip detection to take place. In turn, the fingerprint detection processing block 11 detects the user's fingerprint and generates fingerprint data accordingly. The CPU 12 writes the fingerprint data illustratively to the RAM 14 for storage, thereby acquiring the fingerprint data.

With the fingerprint data thus generated and acquired, the CPU 12 goes to step S403. In step S403, the CPU 12 transmits the acquired fingerprint data to the keyless entry support system 3 together with an unlock request command.

In step S501, the CPU 21 of the keyless entry support system 3 waits for the unlock request command to come in. When the unlock request command is found to be received, the CPU 21 goes to step S502 and subsequent steps.

Steps S502 and S503 constitute a process for personal authentication based on a fingerprint match. In step S502, which is executed for fingerprint matching, the CPU 21 transfers the received fingerprint data to the match processing block 25 together with the unlock request command. The CPU 21 also transfers successively the fingerprint data items registered in the authentication table 24a to the match processing block 25. In turn, the match processing block 25 checks the received fingerprint data against each of the registered fingerprint data items for a match and outputs the result of the check.

In step S503 following step S502, the CPU 21 receives the result of the matching done by the match processing block 25, to see if there is a match between the received fingerprint data and the registered fingerprint data.

If in step S503 no match is detected between the received fingerprint data and the registered fingerprint data, that means the personal authentication has failed. In that case, the processing is brought to an end and no further step is carried out. In other words, the system determines that an unauthorized person has tried to unlock the vehicle doors fraudulently by operating the remote controller 1. The attempt to unlock the doors is then rejected and no settings of the boarding environment are changed.

If in step S503 a match is detected between the received fingerprint data and the registered fingerprint data, then step S504 and subsequent steps are reached and carried out.

In step S504, the CPU 21 causes the door locking/unlocking mechanism 31 of the vehicle body-related block 30 to unlock the doors of the vehicle 2.

Steps S505 through S507 constitute a process for changing the settings of the vehicle body. In step S505, the CPU 21 references the authentication table 24a to recognize the user ID associated with the previously registered fingerprint data item that matches the received fingerprint data. With the user ID recognized, step S505 is followed by step S506.

In step S506, the CPU 21 acquires from the vehicle body-related setting table 24b the vehicle body-related setting information (i.e., exterior mirror position information, interior mirror position information, and seat position information) associated with the user ID recognized in step S505 above.

In step S507, the CPU 21 changes the relevant settings of the vehicle body based on the exterior mirror position information, interior mirror position information, and seat position information acquired in step S506 earlier. More specifically, the exterior mirror moving mechanism 32 is controlled so as to attain the exterior mirror orientation designated by the exterior mirror position information; the interior mirror moving mechanism 33 is controlled to reach the interior mirror orientation specified by the interior mirror position information; and the seat positioning mechanism 34 is controlled to obtain the seat position reflecting the seat position information.

The above steps up to step S507, when carried out, complete the change of the settings related to the vehicle body. The change of the vehicle body settings is followed by the change of the settings on the onboard equipment 40. The latter change is performed by the CPU 41 in the onboard equipment 40.

In step S508 following step S507, the CPU 21 of the central control block 20 transmits a setting change request command along with the user ID to the CPU 41 of the onboard equipment 40, the command instructing the CPU 41 to change the settings of the onboard equipment 40. The user ID sent at this point to the CPU 41 is the user ID recognized in step S505 earlier.

In step S601, the CPU 41 of the onboard equipment 40 waits for the setting change request command to come in. Upon verifying receipt of the command, the CPU 41 goes to step S602 and subsequent steps.

Steps S602 and S603 constitute a process for changing the onboard equipment settings. In step S602, the CPU 41 acquires from the AV setting table 44a in the NV-RAM 44 the AV setting information corresponding to the user ID received earlier together with the setting request command. That is, the CPU 41 obtains the L/R balance, F/R balance, volume, and tuner preset information as well as the picture quality setting information, which have been stored in association with the received user ID.

In step S603, the CPU 41 carries out a control process to establish the AV setting environment designated by the setting information acquired in step S602 above. More specifically, steps 7 through 10 outlined in FIG. 5 are carried out. The CPU 41 controls an audio signal output circuit of the AV signal processing block 46 so as to attain the L/R audio balance, F/R audio balance, and volume level designated by the L/R balance, F/R balance, and volume settings respectively. Furthermore, the CPU 41 controls a display circuit of the display unit 48 to bring about the degree of picture quality specified by the picture quality setting information, as discussed earlier in connection with steps 7 through 10 in FIG. 5.

In step S603, which corresponds to step 11 in FIG. 5, the CPU 41 performs a control process to change the content list of the content data to be reproduced from the storage block 50. More specifically, the CPU 41 references the user content list table 50b-2 in the content management information 50b to acquire the content list and frequency list corresponding to the user ID received along with the setting change request command. Based on the content list and frequency list thus acquired, the CPU 41 changes the list of content items to be output and reproduced from the storage block 50. Illustratively, the content items included in the acquired content list are established as the content to be output and reproduced from the storage block 50. The order in which the content items are to be reproduced can be determined in accordance with the frequency list.

With step S603 completed, step S604 is reached in which the CPU 41 transmits a setting change completion notice to the CPU 21 of the central control block 20, notifying the latter that the change of the settings related to the onboard equipment 40 is now complete.

The CPU 21 of the central control block 20 receives the notice in step S509. The CPU 21 then brings the processing to an end.

It has been revealed in the foregoing description that the keyless entry support system 3 has two CPUs, i.e., CPU 21 of the central control block 20 and CPU 41 of the onboard equipment 40, and that these two CPUs work in collaboration to provide the necessary processing operations. However, an alternative set of specifications for the keyless entry support system 3 may let the CPU 21 of the central control block 20 take over all control operations including those of the CPU 41 of the onboard equipment 40, thereby eliminating the CPU 41.

In the embodiment discussed above, the programs for implementing the processes outlined in the flowcharts of FIGS. 10 through 12 are stored beforehand in a plurality of locations: in the ROM 13 of the remote controller 1, and in the ROMs 22 and 42 of the central control block 20 and onboard equipment 40 respectively in the keyless entry support system 3.

The programs above may be retained on such removable recording media as CD-ROMs (compact disc read only memories), MO (magneto-optical) discs, DVDs (digital versatile discs), magnetic discs, or semiconductor memories, either temporarily or permanently. Such removable recording media may be offered to users as so-called package software.

Illustratively, with the above embodiment in use, programs may be offered as package software recorded on a suitable medium which is loaded into the media drive 45 of the onboard equipment 40 for eventual program retrieval and execution. The keyless entry support system 3 causes the media drive 45 to read the programs from the loaded medium and write the retrieved programs to an appropriate ROM for installation.

Where the above-described embodiment is in use, the personal authentication process starts with the remote controller 1 picking up the detection target object (i.e., user's fingerprint) and obtaining detection information (i.e., fingerprint data) accordingly. The detection information thus acquired is transmitted to and received by the keyless entry support system 3 which utilizes the received fingerprint data as a basis for personal authentication. That is, the personal authentication process of the keyless entry system is carried out primarily by the keyless entry support system 3 on the side of the vehicle 2; the remote controller 1 is used merely to execute detection of the target object.

Alternatively, the remote controller 1 may be designed to take over the personal authentication process. More specifically, the remote controller 1 may pick up the user's fingerprint, acquire fingerprint data accordingly, and proceed with the personal authentication process based on the acquired fingerprint data. Once the user is successfully authenticated, the remote controller 1 may transmit to the keyless entry support system 3 commands instructing the latter to unlock the vehicle doors and change the settings of the boarding environment to suit the user in question. If the authentication is unsuccessful, the remote controller 1 will not send the commands to the keyless entry support system 3.

To let the remote controller 1 take over the personal authentication process illustratively involves storing the authentication table 24*a* into the ROM 13 of the remote controller 1 and getting the CPU 11 to perform the authentication based on the authentication table 24*a* and the detected fingerprint data.

The above-described settings of the boarding environment for this embodiment are only for illustration purposes. Alternatively, the settings other than those of the external/internal mirror positions and seat position may be changed as needed with regard to the vehicle body.

The settings of the onboard equipment may also be varied in a manner other than that discussed above. For example, the changeable settings of the onboard equipment are not limited to the audio/video settings alone. Alternatively, the settings of the navigation function may be modified as well.

The navigation system has its own information acquired and registered in user-specific fashion, such as driving history and checked destinations of each user. These items of information may also be changed as part of the onboard equipment settings every time a different user gains access to the vehicle. This provides additional convenience to the navigation feature of the vehicle.

Furthermore, the above-described specific structures of the remote controller and keyless entry support system constituting the keyless entry system embodying this invention are only for illustration purposes; these structures may be altered as needed.

As described and according to the invention, the keyless entry system of the vehicle is combined with the personal authentication system to make up a keyless entry system that provides reinforced security.

A plurality of users are allowed to register as legitimate users with the system. Each of these users is identified upon entry into the vehicle, the identification being utilized upon unlocking of the vehicle doors as a basis for changing the current boarding environment, i.e., for bringing into effect the boarding environment settings registered in advance for the identified user.

The feature above supplements the keyless entry system based on personal authentication with the capability of automatically changing the boarding environment of the vehicle depending on the user wishing to drive the vehicle. The registered users are thus offered greater ease of use and more convenience than ever before when getting into the vehicle equipped with the inventive keyless entry system.

As many apparently different embodiments of this invention may be made without departing from the spirit and scope thereof, it is to be understood that the invention is not limited to the specific embodiments thereof except as defined in the appended claims.

What is claimed is:

1. A vehicle boarding environment controlling system constituted by a boarding environment controlling apparatus mounted on a vehicle and that communicates with an outside communication device, said boarding environment controlling system comprising:

personal authentication detecting means that detects personal authentication;

communication means for communicating with said boarding environment controlling apparatus;

a communication device equipped with said personal authentication detecting means and said communication means;

personal authentication processing means mounted on said communication device for performing a personal authentication process based on personal authentication information detected by said personal authentication detecting means mounted on said communication device;

transmission means for transmitting to the boarding environment controlling apparatus, the personal authentication information and a personal ID processed by the personal authentication processing means;

registration storing means which, in association with the personal authentication information and the personal ID of each of a plurality of persons to be authenticated in said personal authenticating process, stores registrations of setting status information denoting a predetermined boarding environment of said vehicle; wherein the registrations are stored in at least a vehicle body-related setting table, an audio/video setting table, and a content management information file; the vehicle body-related setting table including setting status information relating to settings of at least mirrors and seat positions in the vehicle; the audio/video setting table including setting status information relating to settings of audio/video equipment in the vehicle; the content management information file including a content list of audio/video content loaded into a media player in the vehicle;

attestation means for attesting to a match between the personal authentication information and personal ID transmitted by the transmission means and the personal authentication information and the personal ID stored in the registration storing means;

attestation transmission means for transmitting to the communication means an attestation result from the attestation means;

setting control instruction transmission means for transmitting setting control instructions to the boarding environment controller from the communication means based on the attestation result transmitted by the attestation transmission means;

setting status controlling means for changing the status of settings to a registered boarding environment in a vehicle based on the setting status information and corresponding setting control instructions transmitted by the setting control instruction transmission means.

2. The vehicle boarding environment controlling system apparatus according to claim 1, wherein said setting status controlling means changes, as said boarding environment setting status, a setting status of a mechanism related to a body of said vehicle.

3. The vehicle boarding environment controlling system according to claim 2, wherein said mechanism related to the body of said vehicle is at least one of an exterior mirror moving mechanism, an interior mirror moving mechanism, and a driver seat position moving mechanism.

4. The vehicle boarding environment controlling system according to claim 1, wherein said setting status controlling means changes, as said boarding environment setting status, a setting item regarding electronic equipment mounted on said vehicle and which has predetermined functions.

5. A vehicle boarding environment controlling method for use with a boarding environment controlling system constituted by a communication device and by a boarding environment controlling apparatus mounted on a vehicle and which communicates with said communication device, said boarding environment controlling method comprising the steps of:

detecting authentication through said communication device;

performing a personal authentication process based on results obtained in said step of detecting;

transmitting to the boarding environment controlling apparatus, the personal authentication information and a personal ID processed by the personal authentication processing means;

communicating with the communication device that performs said personal authentication process;

storing, into a predetermined storage area, registrations of setting status information denoting a predetermined boarding environment of said vehicle in association with the personal authentication information and the personal ID of each of a plurality of persons to be authenticated in said personal authentication process; wherein the registrations are stored in at least a vehicle body-related setting table, an audio/video setting table, and a content management information file; the vehicle body-related setting table including setting status information relating to settings of at least mirrors and seat positions in the vehicle; the audio/video setting table including setting status information relating to settings of audio/video equipment in the vehicle; the content management information file including a content list of audio/video content loaded into a media player in the vehicle;

attesting to a match between the personal authentication information and personal ID transmitted in the transmission step and the personal authentication information and the personal ID stored in the storing step;

transmitting to the communication means an attestation result from the attestation means;

transmitting setting control instructions to the boarding environment controller from the communication means based on the attestation result transmitted in the attestation transmission step; and changing the status of settings to a registered boarding environment in a vehicle based on the setting status information associated with the authenticated person and corresponding setting control instructions.

* * * * *